United States Patent
Kang et al.

(10) Patent No.: US 7,372,854 B2
(45) Date of Patent: May 13, 2008

(54) COMMUNICATION NODE SYSTEM, CONTROL NODE SYSTEM, AND COMMUNICATION SYSTEM USING NODE SYSTEMS IN ETHERNET-PASSIVE OPTICAL NETWORK

(75) Inventors: Ho-Yong Kang, Daejeon (KR); Tae-Whan Yoo, Daejeon (KR); Hyeong-Ho Lee, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1063 days.

(21) Appl. No.: 10/633,120

(22) Filed: Aug. 1, 2003

(65) Prior Publication Data

US 2004/0114592 A1    Jun. 17, 2004

(30) Foreign Application Priority Data

Nov. 27, 2002    (KR)    ................ 10-2002-0074517

(51) Int. Cl.
*H04L 12/56*    (2006.01)
*H04J 14/00*    (2006.01)

(52) U.S. Cl. .................. 370/390; 370/392; 370/474; 398/58; 398/66; 398/168

(58) Field of Classification Search ............. 370/389, 370/390, 392, 469, 474; 398/58, 66, 71, 398/98, 168
See application file for complete search history.

(56) References Cited

U.S. PATENT DOCUMENTS

| | | | |
|---|---|---|---|
| 7,245,621 B2 * | 7/2007 | Sala et al. | 370/392 |
| 7,274,695 B2 * | 9/2007 | Kim et al. | 370/389 |
| 2003/0117998 A1 * | 6/2003 | Sala et al. | 370/351 |
| 2003/0137975 A1 * | 7/2003 | Song et al. | 370/353 |
| 2003/0152389 A1 * | 8/2003 | Sala et al. | 398/98 |
| 2003/0190168 A1 * | 10/2003 | Song et al. | 398/168 |
| 2003/0235205 A1 * | 12/2003 | Song et al. | 370/466 |
| 2004/0028409 A1 * | 2/2004 | Kim et al. | 398/71 |

(Continued)

FOREIGN PATENT DOCUMENTS

KR    1995-022492    7/1995

(Continued)

OTHER PUBLICATIONS

Hiroshi Suzuki et al., EPON P20 Emulation and Downstream Broadcase; IEEE802.3 EFM Task Force; Mar. 2002. (5 pages).

*Primary Examiner*—Chi Pham
*Assistant Examiner*—Ahmed Elallam
(74) *Attorney, Agent, or Firm*—Blakely, Sokoloff, Taylor & Zafman LLP (57) ABSTRACT

A communication node system for an Ethernet-PON includes: an LLID register for storing an LLID being an allocated identifier; a preamble generator for generating a PON preamble; a CRC generator for generating a CRC for the preamble; a transmission connector for combining transport data with the CRC-including preamble to generate a transport frame, and forwarding the transport frame; a reception connector for receiving the frame and dividing the frame into a preamble and received data; a filter for extracting an LLID from the preamble, comparing the extracted LLID with the LLID stored in the register, and selectively filtering the extracted LLID; and a received frame generator for discarding the received data, or combining the received data with the preamble to generate a received frame.

16 Claims, 6 Drawing Sheets

U.S. PATENT DOCUMENTS

| | | | |
|---|---|---|---|
| 2004/0057431 A1* | 3/2004 | Song et al. | 370/390 |
| 2004/0100962 A1* | 5/2004 | Kim et al. | 370/392 |
| 2004/0120315 A1* | 6/2004 | Han et al. | 370/389 |
| 2005/0249498 A1* | 11/2005 | Haran et al. | 398/58 |

FOREIGN PATENT DOCUMENTS

KR  1020010038416  5/2001

* cited by examiner

COMMUNICATION NODE SYSTEM, CONTROL NODE SYSTEM, AND COMMUNICATION SYSTEM USING NODE SYSTEMS IN ETHERNET-PASSIVE OPTICAL NETWORK

CROSS REFERENCE TO RELATED APPLICATION

This application claims priority to and the benefit of Korea Patent Application No. 2002-74517 filed on Nov. 27, 2002 in the Korean Intellectual Property Office, the content of which is incorporated herein by reference.

BACKGROUND OF THE INVENTION (a) Field of the Invention

The present invention relates to a communication node system, a control node system, and a communication system using those node systems in an Ethernet-PON (Passive Optical Network).

(b) Description of the Related Art

Ethernet-PON (hereinafter referred to as "EPON") is a passive optical subscriber network designed for applying the Ethernet used in the existing LANs (Local Area Networks) to general subscriber networks. EPON is comprised of the PON that has passive splitters for combining, in a passive manner, an OLT (Optical Line Termination) connected to the network with ONUs (Optical Network Units) connected to subscribers. Namely, the PON is a medium shared tree structure, that unlike the conventional media sharing in the Ethernet, has a directionality of data transmission due to the characteristics of fiber and splitters such that a down-stream frame sent from the OLT is forwarded to all the ONUs, while an up-stream frame is sent directly to the OLT from one ONU without being forwarded to another ONU.

The EPON uses an approach for communicating Ethernet frames between an OLT connected in the PON form and a plurality of ONUs, and it is now standardized as IEEE 802.3ah. The existing Ethernet supports shared medium and point-to-point links. A PON in which down-stream data are broadcast and up-stream data are forwarded only to the OLT based on TDM (Time Division Multiplexing) is a network not supported in the existing MAC (Media Access Control).

With the upper bridge connected in the PON, a problem occurs in regard to compatibility. Namely, when an ONU sends a MAC frame to an OLT and the MAC frame is forwarded to another ONU, the upper bridge must send the frame to the same port again, and accordingly, the ONU again receives the MAC frame at the same port as used for sending the MAC frame. This is unacceptable in the existing bridge. For the purpose of compatibility with the existing bridge, the PON structure has an LLID (Logical Link Identification) for logical identification of the ONU, inserted into the 8-byte preamble to acquire compatibility with the upper bridge. Using the LLID, the EPON system appears as multiple point-to-point links in a point-to-multipoint communication environment so as to be compatible with the upper bridge. The LLID in the down-stream frame represents the ONU to which the frame is forwarded (LLID may include "broadcast"), and the LLID in the up-stream frame represents the ONU from which the frame is forwarded.

In the existing Ethernet, all the terminals or nodes belonging to the same LAN segment receive the same frames at the same time. In the PON, for forwarding a frame from one ONU to another, the ONU sends the frame to the OLT and then the OLT returns the frame to the corresponding ONU with its destination address. But the frame received at the OLT cannot be returned to the ONU according to the existing Ethernet standard. To solve this problem in the EPON, some approaches have been attempted, as follows.

In the first approach, an emulation layer for point-to-point communication is provided between a physical (PHY) layer and a MAC layer. This approach is subdivided into two methods. In one method, the emulation layer removes a PON-tag from all the frames received from the ONU, sends the removed PON-tag to the upper layer, and broadcasts a copy of the frame to all the ONUs through a PON interface. Each ONU checks the PON-tag of the received frame. The ONU discards the frame by filtering if the PON-tag is identical to its PON-tag; otherwise, it removes the PON-tag and sends it to the upper layer. However, this method that returns all the frames to the PON interface even in the case of non-point-to-point communication between ONUs has a problem in regard to an excessive consumption of the down-stream bandwidth in the PON.

In the other method, the PON-tag attached to the up-stream frame from each ONU is used to discriminate the frame, which is then forwarded to the upper MAC layer. As many logic MAC layers are provided as there are ONUs connected to the PON interface. Each MAC layer is connected to the port of the bridge so that the frame is switched through the bridge and forwarded down through the corresponding MAC layer. The frame forwarded from the bridge is combined with the PON-tag corresponding to the destination address and is broadcast to the ONU through the PON interface. The ONU checks the PON-tag of the received frame, and removes the PON-tag and sends the frame to the upper layer if the PON-tag is identical to its PON-tag; otherwise, it discards the frame by filtering. In this case, each MAC layer performs frame multiplexing, and inter-MAC layer multiplexing must be performed once again, thus making the frame multiplexing complicated. Additionally, this method must provide as many logical MAC layers as there are ONUs for one PON interface.

In the second approach, a shared LAN emulation layer is provided on the MAC layer of the OLT. The shared LAN emulation layer is comprised of three parts, i.e., a lower layer shared LAN emulation layer, a logical MAC layer, and an upper layer shared LAN emulation layer. The lower layer shared LAN emulation layer checks the LLID of the up-stream frame from the ONU and sends the frame to the MAC layer. The logical MAC layer sends the frame to the upper layer shared LAN emulation layer. The upper layer shared LAN emulation layer, which has a similar function to the bridge of the IEEE 802.1D, checks the LLID of the frame for point-to-point communication and sends the frame to the corresponding logical MAC layer. The logical MAC layer sets the LLID to the frame and sends the frame to the lower layer. For broadcasting, the frame is forwarded down with a separate broadcasting logical MAC, in which case broadcasting bits are set. Here, the number of the logical MACs is k (the number of LLIDs×2+1), and the frame format must be different from the standard for the purpose of the shared LAN emulation function. The precise frame format is not mentioned in the cited reference of this technology. Moreover, the need for multiplexing between logical MACs increases the complexity of the multiplexing for the down-stream data.

SUMMARY OF THE INVENTION

It is an advantage of the present invention to facilitate point-to-point communication between ONUs in EPON, i.e., to provide point-to-point communication in a point-to-multipoint communication environment using LLIDs.

It is another advantage of the present invention to provide a hardware structure of an emulation sublayer of each node system for point-to-point communication in a communication node system.

In one aspect of the present invention, there is provided a communication node system, which is for an Ethernet-PON (Passive Optical Network), the communication node system including: an LLID register for storing an LLID (Logical Link Identification) being an allocated identifier; a preamble generator for generating a PON preamble using the LLID; a CRC (Cyclic Redundancy Check) generator for generating a CRC for the preamble; a transmission connector for combining transport data with the CRC-including preamble to generate a transport frame, and forwarding the transport frame to the network; a reception connector for receiving the frame from the network and dividing the received frame into a preamble and received data; a filter for extracting an LLID from the preamble, comparing the extracted LLID with the LLID stored in the register, and selectively filtering the extracted LLID; and a received frame generator for, based on the filtering result from the filter, discarding the received data, or combining the received data with the preamble to generate a received frame.

The communication node system further includes: a CRC section for performing a CRC for the preamble divided from the received frame; and a status counter register for storing the CRC result of the CRC section. In addition, the communication node system further includes a shift register for temporarily storing the received data during the CRC for the preamble.

The filter determines that the received frame is forwarded to itself, and performs a success operation on the received frame, when the extracted LLID is a broadcast LLID and is identical to the LLID stored in the LLID register.

The filter determines that the received frame is forwarded to itself, and performs a success operation on the received frame, when the extracted LLID is an anti-LLID and the predetermined lower bits of the LLID stored in the LLID register are identical to the predetermined lower bits of the extracted LLID.

The filter discards the received frame when the extracted LLID is an anti-LLID and the predetermined lower bits of the LLID stored in the LLID register are not identical to the predetermined lower bits of the extracted LLID.

The preamble includes a 2-byte SFD (Start Frame Delimeter), a 3-byte reserved word, a 2-byte LLID, and a 1-byte CRC.

The CRC generator generates the CRC for the preamble using a CRC-8.

In another aspect of the present invention, there is provided a control node system, which is for data communication between a plurality of communication node systems in an Ethernet-PON (Passive Optical Network), the control node system including: an LLID (Logical Link Identification) register for storing LLIDs being identifiers allocated to the plural communication node systems connected to the network; a preamble generator for generating a PON preamble based on the LLID of a destination communication node system, when sending transport data supplied from an originating communication node system to the destination communication node system via the network; a CRC (Cyclic Redundancy Check) generator for generating a CRC for the preamble; a transmission connector for combining the transport data with the CRC-including preamble to generate a transport preamble and forwarding the transport preamble to the network, thereby causing the network to forward the transport preamble to the destination communication node system; a reception connector for receiving a frame from the originating communication node system via the network, and dividing the received frame into a preamble and received data; a filter for extracting the LLID from the preamble, and comparing the extracted LLID with the LLID stored in the LLID register to determine whether or not the received frame is transferred from a controllable communication node system; and a received frame generator for combining the received data with the preamble to generate a received frame based on the filtering result of the filter.

The filter discards the received frame when the lookup for the LLID register shows that the LLID extracted from the preamble of the received frame is not present in the LLID register.

The received frame generator combines the received data with the preamble to generate a combined frame, generates an interval signal representing an interval of the received data, and forwards the generated interval signal with the combined frame.

In addition, the control node system further includes a status counter register for storing the lookup result of the filter. The control node system increases an error count value of the status counter register by "1" to determine whether or not the LLID of the received frame has an error, when the LLID extracted from the preamble of the received frame is not present in the LLID register.

The LLID register includes as many 16-bit registers as there are communication node systems connected to the network. The LLID register has a value of "FFFF" and stores an input LLID value with a message in a power-on state.

In further another aspect of the present invention, there is provided a communication system, which is for an Ethernet-PON (Passive Optical Network), the communication system including: at least one communication node system including a first LLID (Logical Link Identification) register for storing an LLID as an allocated identifier, a first preamble generator for generating a PON preamble using the LLID, a first CRC generator for generating a CRC for the preamble, and a first transmission connector for combining transport data with the CRC-including preamble to generate a transport frame and forwarding the transport frame to the network; and a control node system including a second LLID register for storing LLIDs as an identifier allocated to the plural communication node systems connected to the network, a first reception connector for receiving a frame from the communication node system via the network and dividing the received frame into a preamble and received data, a first filter for extracting the LLID value from the preamble and comparing the extracted LLID with the LLID stored in the first LLID register to determine whether or not the received frame is transferred from a controllable communication node system, a first received frame generator for combining the received data with the preamble to generate a received frame based on the filtering result of the first filter, a second preamble generator for receiving transport data to be transmitted to one communication node system and generating a PON preamble based on the LLID of the destination communication node system of the transport data, a second CRC generator for generating a CRC for the preamble, and a second transmission connector for combining the transport data with the CRC-including preamble to generate a transport frame and forwarding the generated transport frame to the network, thereby causing the network to forward the transport frame to the destination communication node system.

The communication node system further includes: a second reception connector for receiving a frame from the network and dividing the received frame into a preamble and received data; a second filter for extracting an LLID value from the preamble and comparing the extracted LLID with the LLID stored in the first LLID register to selectively filter the extracted LLID; and a received frame generator for, based on the filtering result of the second filter, discarding the received data or combining the received data with the preamble to generate a received frame.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
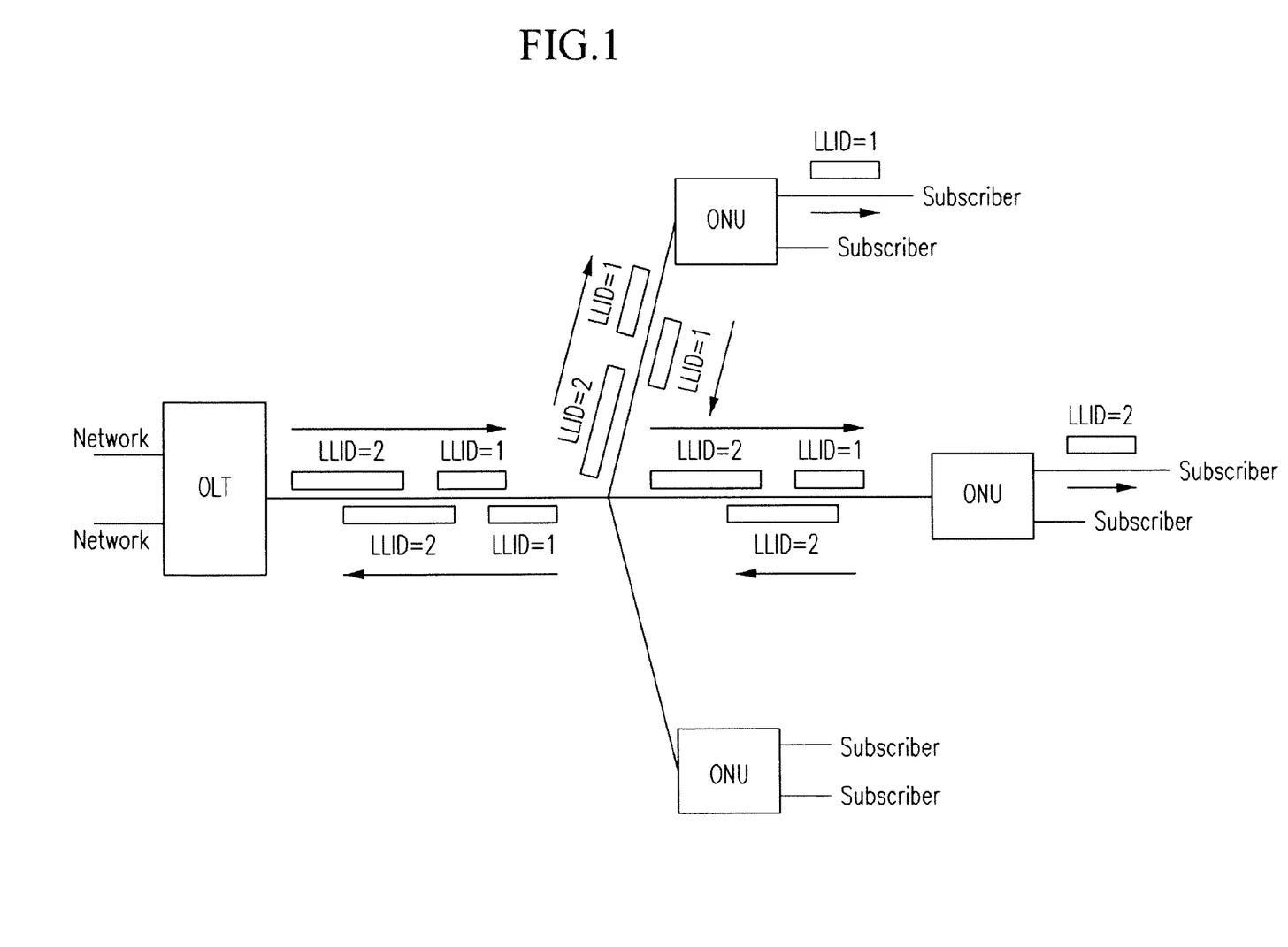
FIG. 1 is a schematic of an EPON according to an embodiment of the present invention.

FIG. 1 is a schematic of an EPON according to an embodiment of the present invention.

The EPON according to the embodiment of the present invention includes, as shown in FIG. 1, a passive splitter combining, in a passive manner, an OLT connected to the network with a plurality of ONUs connected to subscribers.

In the point-to-multipoint digital communication environment, LLIDs are used to make the point-to-multipoint link appear as a point-to-point link and maintain compatibility with the upper bridge.

When one ONU sends an up-stream frame to an ONU and the frame is forwarded only to the destination ONU, for example, a downstream LLID having a different value from the upstream LLID receiving the frame is used, if violating the bridge regulation, to receive the frame on the same physical route in the standpoint of the bridge and resend it on the same route. In this manner, the use of a different LLID makes the ONU operate as if the frame is forwarded on a different route. This LLID processing prevents the upper NP (Network Processor) or switch from recognizing that the EPON is present in the lower layer. By the passive splitter of down-stream fiber, the frame is broadcast to every ONU, and the corresponding ONU determines from the LLID whether to receive the frame. Upstream, each ONU sends the frame to the OLT at its allocated time according to the grant of the OLT, so that the individual frames sequentially arrive at the OLT. From the LLID in the preamble, the OLT can detect the ONU from which the frame is forwarded.

Figure 2:
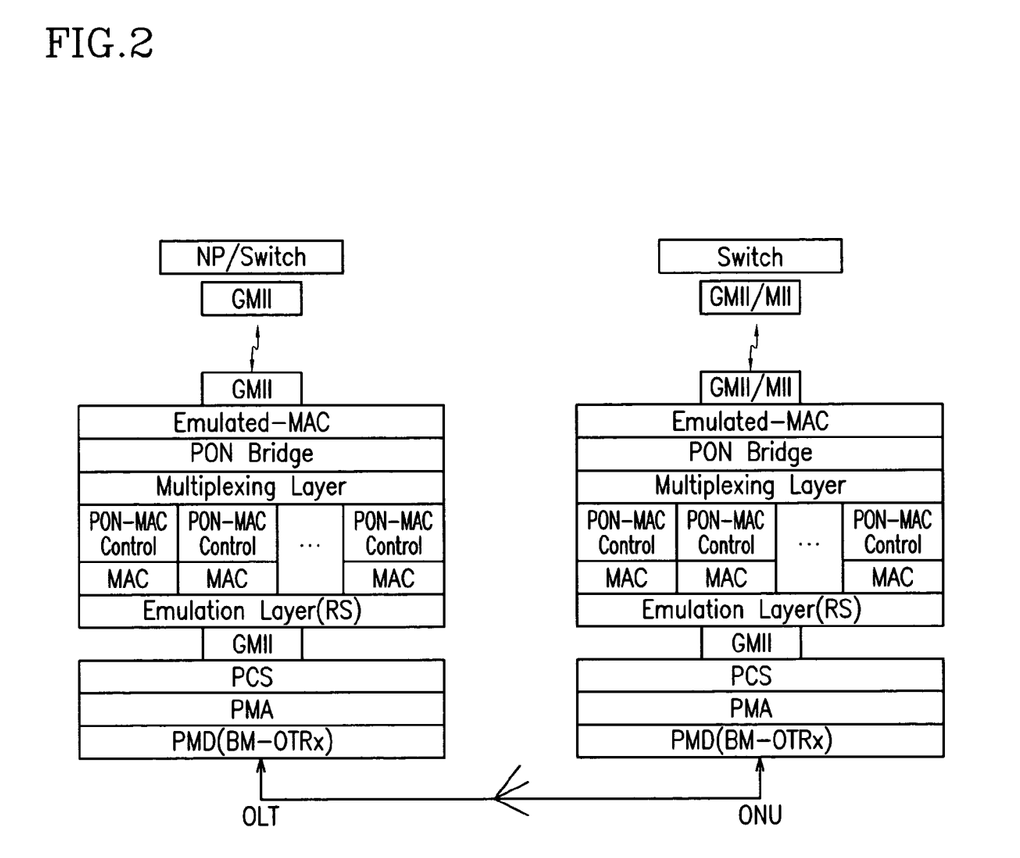
FIG. 2 illustrates the hierarchical structure of node systems according to an embodiment of the present invention.

FIG. 2 illustrates a hierarchical structure of the OLT as the communication node system and the ONU as the control node system according to the embodiment of the present invention.

Here, PCS (Physical Coding Sublayer), PMA (Physical Media Attachment), and PMD (Physical Media Dependent) are physical layers in the EPON.

The PCS uses an 8B10B algorithm for line coding, and it has functions of code group synchronization and data communication with MAC layers. The PMA has functions of SerDes (Serialize and De-Serialize), clock and data recovery, and PLL (Phase Locked Loop), and a comma detection function for generating parallel 10-bit code groups enabled in serial data.

The PMD has functions of 1.25 Gb/s burst mode optical communication, i.e., a burst mode optical reception function and a continuous mode optical transmission function at the OLT; and a burst mode optical transmission function and a continuous mode optical reception function at the ONU.

The data link layer is comprised of an emulation sublayer, a MAC sublayer, a MAC control sublayer, a PON bridge sublayer, and an emulated-MAC sublayer. The data link layer and the physical layer communicate data through a GMII (Gigabit Media Independent Interface). The GMII has an interfacing function for processing Ethernet frames at a speed of 1 Gigabit or less in the interface standard.

The emulation layer (called "RS (Reconciliation Sublayer)") performs a CRC (Cyclic Redundancy Check) on the information included in the preamble for up-stream frames from the physical layer, and extracts LLID information to support LLID-based MAC sublayer processing at the upper layer. For ONUs, the emulation layer performs the filtering function for the corresponding LLID to send the frames to the upper layer.

In frame transmission, the emulation layer receives an LLID-attached frame from the MAC control sublayer, adds an SFD (Start Frame Delimiter) before the LLID, calculates the CRC value for a 7-byte preamble, and inserts the calculated CRC value to the eighth preamble byte to generate an EPON preamble, which is inserted before the down-stream frame from the MAC sublayer and forwarded to the physical layer via the GMII.

Downstream, the MAC sublayer has functions of generating an FCS (Frame Check Sequence) for MPCP control frames among the Ethernet frames from the PON-MAC control sublayer, inserting an IFG (Inter Frame Gap), and managing an MIB (Management Information Base) counter for down-stream frames. Upstream, the MAC sublayer has functions of performing an FCS check, address filtering, and MIB counter management for up-stream frames, and providing the frames to a CPU.

The MAC and the MAC control sublayer are separately constructed by the LLIDs.

The PON-MAC control sublayer at the OLT performs band allocation, scheduling, and other operations related to the MAC control. The PON-MAC control sublayer can also be called an "MPCP section", because MPCP is recommended in the current IEEE 802.3ah as an approach for controlling PON transmission while conserving the Ethernet MAC frame transmission standard.

The PON bridge sublayer has an EPON-related basic bridge function, and it provides inter-ONU communication and VLAN multicasting in the PON system by generation and management of a filtering address table for storing destination MAC addresses and VLAN (Virtual LAN) IDs by the PON-tags.

The emulated-MAC sublayer provides functions of up/down-stream Ethernet frame matching and FCS checking, and PAUSE frame processing, said functions being similar to the MAC functions according to the present invention except for part of the management functions.

Now, a description will be given as to the structure of the communication node system having the above-stated hierarchical structure, i.e., the ONU according to the embodiment of the present invention.

Figure 3:
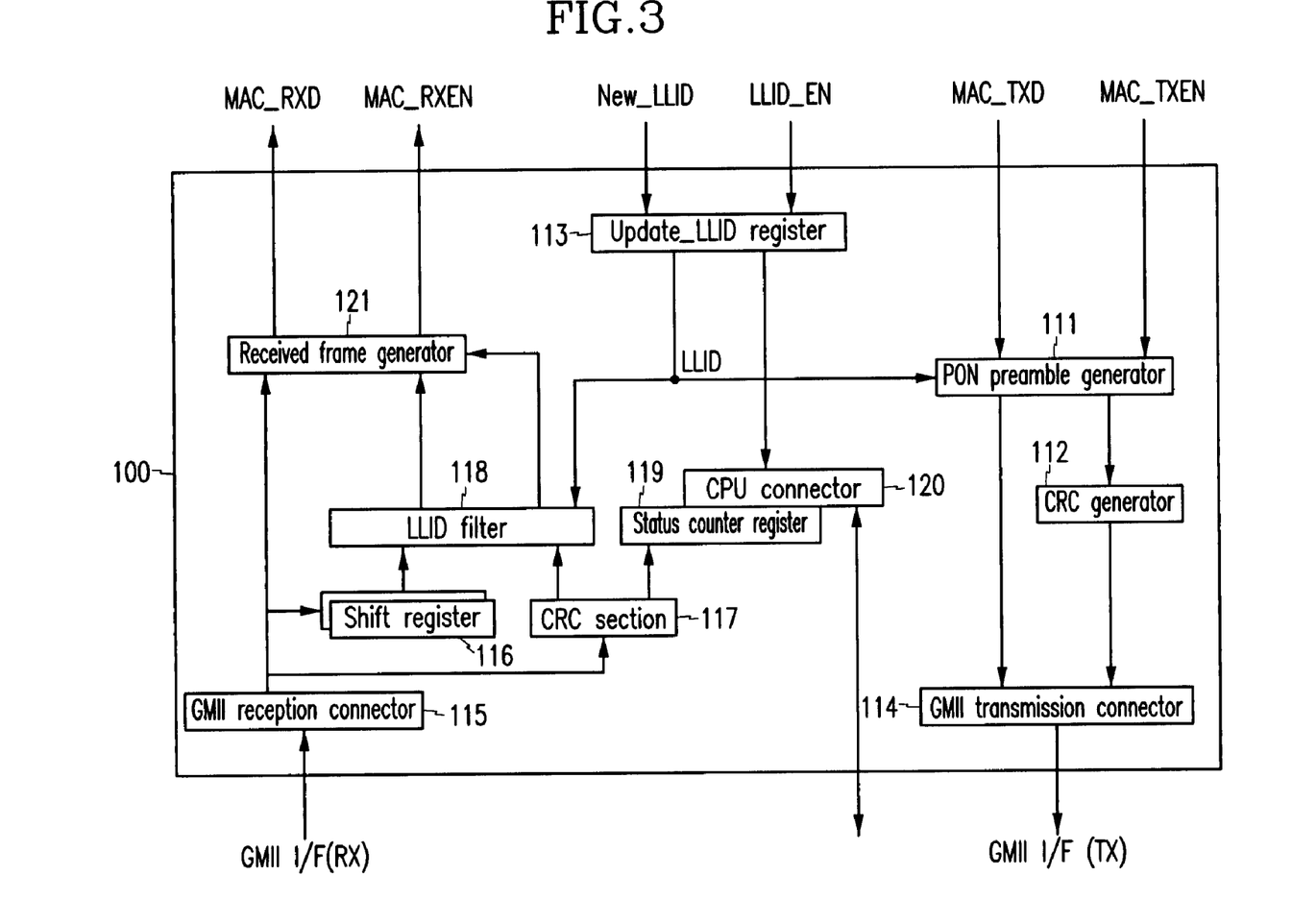
FIG. 3 is a block diagram of a communication node system according to an embodiment of the present invention.

FIG. 3 is a block diagram of the ONU according to the embodiment of the present invention.

The ONU structure shown in FIG. 3 is a hardware structure corresponding to the emulation layer in the EPON, i.e., the RS sublayer, which performs generation and checking of PON preambles including LLIDs.

The ONU according to the embodiment of the present invention comprises, as shown in FIG. 3, a PON preamble generator 111, a CRC generator 112, an update_LLID register (hereinafter referred to as "LLID register") 113, a GMII transmission connector 114, a GMII reception connector 115, a CRC section 117, a shift register 116, an LLID filter 118, a status counter register 119, a CPU connector 120, and a received frame generator 121.

The ONU of the above-constructed structure uses transport data to be forwarded to another ONU, i.e., an MAC_TXD signal as a MAC frame, and a MAC_TXEN signal as an interval signal representing the enable interval of the MAC_TXD signal. The ONU also uses a MAC_RXD signal as a received frame forwarded through the network, and a MAC_RXEN signal as an interval signal representing the enable interval of the MAC_RXD signal. These signals are forwarded from the RS sublayer to the MAC sublayer. A mutual connection to the physical layer connected to the network is achieved through the GMII.

The GMII transmission connector 114 uses a TXD<7:0> signal as 8-bit transport data, a TX_EN signal for representing the enable interval of the transport data, a TX_ER signal for representing the detection of data errors or for encoding, and a GTX_CLK signal for providing a sync clock to the PCS sublayer.

The GMII reception connector 115 uses an RXD<7:0> signal as 8-bit received data, an RX_DV signal for representing the enable interval of the received data, an RX_ER signal for representing the detection of data errors for the received data in PCS coding or for encoding, and an RX_CLK for providing the sync clock of the physical layer to the data link layer. The GMII reception connector 115 also uses, as interface signals, a COL signal for detecting a collision and a CRS signal for detecting a carrier, said signals being necessary for operating in a duplex mode but not in the EOPN system operated in a full duplex mode.

The LLID register 113 is comprised of a single register, which has an initial value of "FFFF." The LLID register 113 stores 16-bit LLIDs acquired from the OLT, through an automatic discovery message from the MAC control sublayer.

The PON preamble generator 111 generates a PON preamble enable signal according to the transport frame, i.e., the MAC_TXEN signal, and an EPON preamble using the LLIDs stored in the LLID register 113.

The GMII reception connector 115 receives a frame with an EPON preamble including the LLIDs forwarded via the PCS layer, and divides the received frame into a PON preamble and MAC data.

The PON preamble CRC section 117 performs a CRC for the divided PON preamble, and the status counter register 119 stores the result of the CRC.

Without errors for the EPON preamble, the LLID filter 118 extracts the LLID value from the PON preamble, compares the extracted LLID with the stored LLID, performs an LLID filtering, and generates a flag signal according to the result of the filtering.

The received frame generator 121 discards the received frame or forwards it to the MAC sublayer of the upper layer, according to the flag signal generated based on the filtering operation of the LLID filter 118.

Now, a description will be given as to the operation of the ONU according to the embodiment of the present invention.

In an EPON, the LLID has a value of 16 bits, and the OLT allocates the LLID to an ONU when the ONU is associated with the OLT. One ONU can have at least two LLIDs. The LLID allocated by the OLT is stored in the LLID register 113.

For frame transmission from one ONU to another, the MAC control sublayer generates a MAC_TXD signal as a transport frame, and a MAC_TXEN signal representing the enable interval of the frame. These signals are forwarded to the emulation layer via the corresponding MAC layer, processed in the following procedures, and then sent to the OLT via the physical layer.

Upon receiving the MAC_TXD signal as a transport frame, the PON preamble generator 111 generates a PON preamble enable signal according to the MAC_TXEN signal, and an EPON preamble using the LLID stored in the LLID register 113.

The EPON preamble according to the embodiment of the present invention has 8 bytes in total, i.e., a 2-byte SFD (Start Frame Delimeter), a 3-byte reserved word, a 2-byte LLID, and a 1-byte CRC.

The CRC generator 112 generates a CRC for the 7-byte EPON preamble. For example, the CRC generator 112 calculates the CRC using a CRC-8, the CRC polynomial equation being $x8+x2+x+1$. The use of the CRC-8 in CRC generation is known to those skilled in the art and will not be described in detail.

The GMII transmission connector 114 adds the generated CRC to the EPON preamble received from the PON preamble generator 111 to generate an 8-byte preamble, inserts the EPON preamble before the MAC_TXD as the transport frame, and generates an enable signal for the whole frame. The enable signal is forwarded to the PCS as a physical layer, which sends the enable signal to the OLT.

Figure 4:
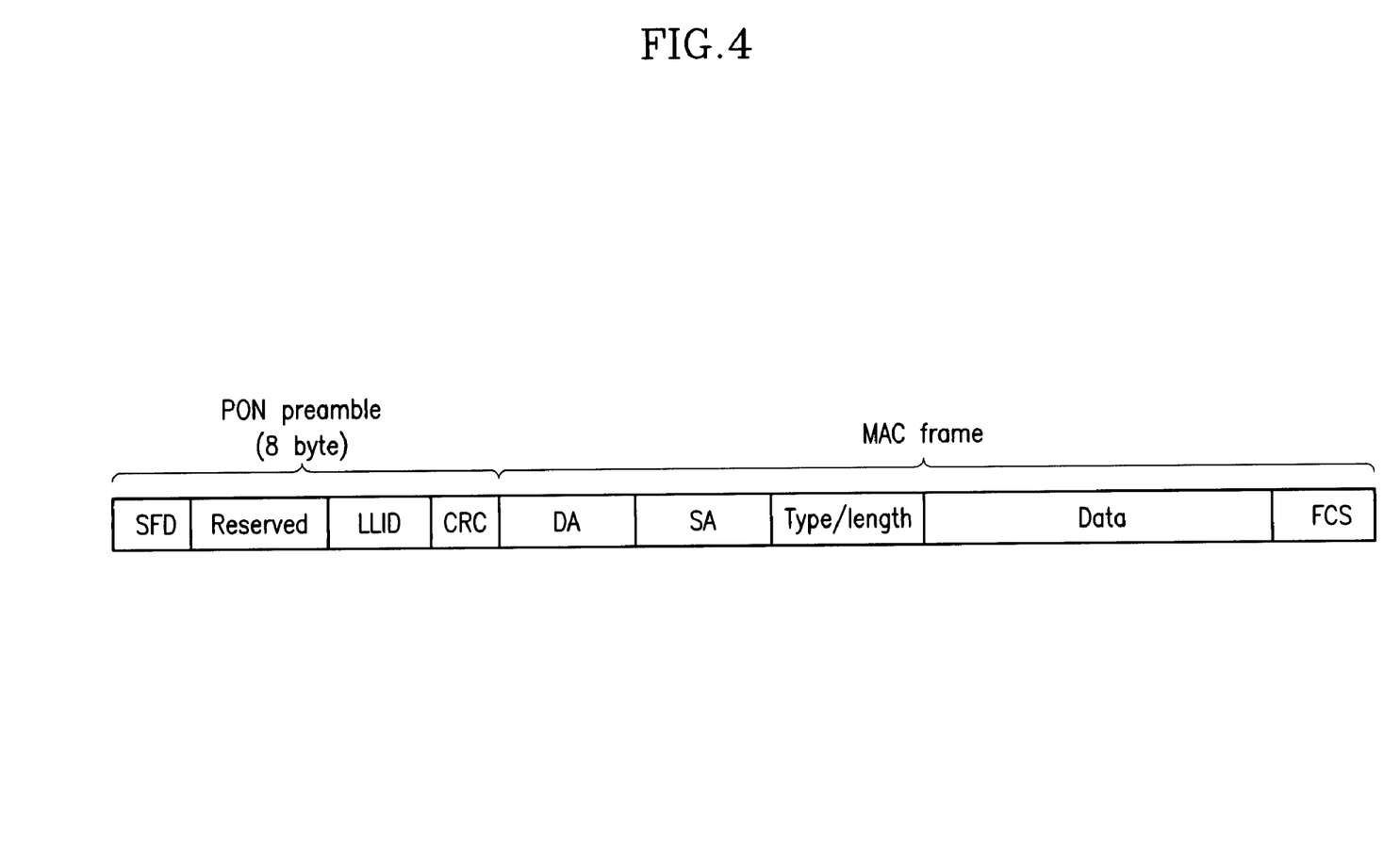
FIG. 4 is an exemplary diagram of a frame structure according to an embodiment of the present invention.

FIG. 4 illustrates an example of an MAC frame structure as a transport frame including the PON preamble according to an embodiment of the present invention. As illustrated above, the PON preamble structure has a 2-byte SFD, a 3-byte reserved word, a 2-byte LLID, and 1-byte CRC data. Basically, the PON preamble is the existing 8-byte Ethernet preamble with the contents of the field modified. The 8-byte PON preamble is a PON preamble substituted for the existing Ethernet preamble before the MAC frame.

The transport frame including the EPON preamble with an assigned LLID is supplied to the ONU corresponding to the destination via the OLT connected to the network.

On the other hand, when a frame sent from another ONU is broadcast to the network by the OLT, the received frame is processed as follows.

The received frame from the OLT is fed into the GMII reception connector 115 via the physical layer. The received frame is a frame with an LLID-including EPON preamble.

Upon receiving the frame via the PCS layer, the GMII reception connector 115 divides the received frame into a PON preamble and MAC data, stores the MAC data in the shift register 116, and supplies the PON preamble to the CRC section 117.

The CRC section 117 performs a CRC for the divided PON preamble, and stores the CRC result in the status counter register 119. During the CRC for the PON preamble, the shift register 116 performs shifting at least 10 times to store the MAC data temporarily and continuously.

If the PON preamble has errors as detected in the CRC, then the CRC section 117 increases the CRC error count value of the status counter register by "1", and enables a CPU (not shown) to check the status of the frame forwarded via the CPU connector 120. In the standpoint of the CPU, the status counter register 119 is a read-only status register.

If the CRC result of the CRC section 117 shows that the EPON preamble has no CRC error, then the LLID filter 118 extracts the LLID value from the PON preamble, compares the extracted LLID with the LLID stored in the LLID register 113, and performs an LLID filtering function.

More specifically, the LLID filter 118 determines whether the extracted LLID is a broadcast LLID or an anti-LLID, and compares the extracted LLID with the LLID stored in the LLID register 113 to perform an LLID filtering function.

In the embodiment of the present invention, one upper bit of the 16-bit LLID is used to mark an anti-LLID. The anti-LLID is used for forwarding down-stream (from OLT to ONU) frames and means "all LLIDs but a specific one". For example, when the second upper bit of the 16 bits is used for "anti", the vale of "1000000000000111" means "all LLIDs but the seventh one" so that the frames are forwarded to all ONUs but one having the seventh LLID. The broadcast LLID means that the 16-bit LLID value is "FFFF". The broadcast LLID is forwarded to all ONUs connected to the OLT.

If the extracted LLID is a broadcast LLID and identical to the LLID stored in the LLID register 113, then the LLID filter 118 determines that the received frame is forwarded to the ONU, and performs a success operation on the extracted LLID unconditionally. If the extracted LLID is an anti-LLID, then the LLID filter 118 performs a success operation on the extracted LLID when defined lower bits (e.g., 15 bits) of the LLID stored in the LLID register 113 are identical to the lower 15 bits of the anti-LLID.

The LLID filter 118 generates a "hit" status flag signal if the LLID comparison result is a success; otherwise, the LLID filter 118 generates a "miss" status flag signal. The generated status flag signals are provided to the received frame generator 121, and the MAC data stored in the shift register 116 are also provided to the received frame generator 121.

If the status flag signal is "miss", then the received frame generator 121 discards the MAC data, i.e., the MAC frame; and if the status flag signal is "hit", then the received frame generator 121 forwards the MAC frame to the MAC sublayer of the upper layer, so that the MAC frame is processed at the CPU (not shown).

Now, a description will be given as to the structure and operation of the control node system, i.e., the OLT that processes the frame generated from the individual ONUs of the above-stated structure and provides the processed frame to the destination ONU.

Figure 5:
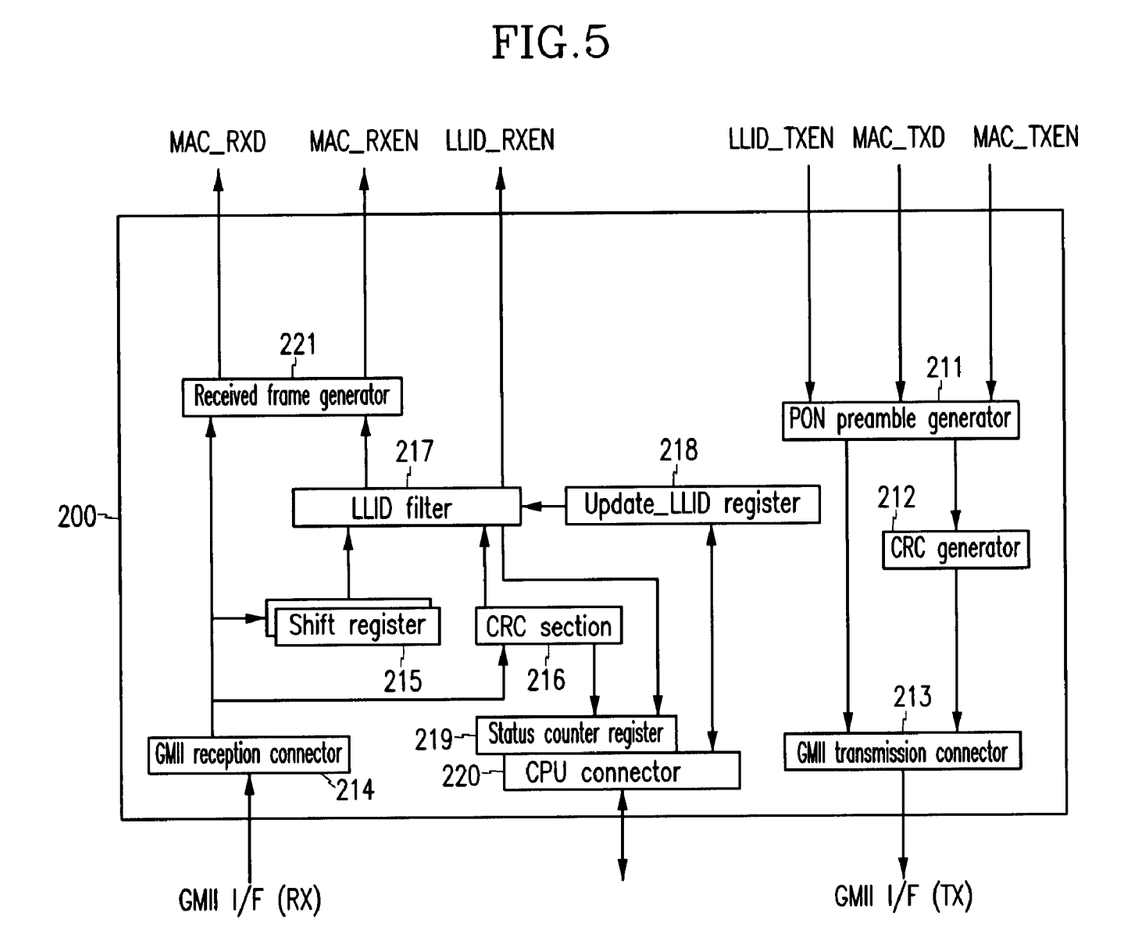
FIG. 5 is a block diagram of a control node system according to an embodiment of the present invention.

FIG. 5 illustrates the structure of the OLT according to an embodiment of the present invention.

Like the ONU, the OLT comprises, as shown in FIG. 5, a PON preamble generator 211, a CRC generator 212, a LLID register 213, a GMII transmission connector 213, a GMII reception connector 214, a shift register 215, a CRC section 216, a LLID filter 217, a status counter register 219, a CPU connector 220, and a received frame generator 221.

The above-constructed OLT operates in the same manner as the ONU previously described, except for the PON preamble generator 211, the LLID filter 217, the LLID register 218, and the received frame generator 221.

Here, the components differently operating from the ONU will be emphasized in describing the operation of the OLT.

The preamble-including MAC frame is fed into the PON preamble generator 211 from the upper layer, i.e., the MAC sublayer with the MAC_TXEN signal representing the MAC frame interval and the LLID_TXEN signal as an interval signal representing the LLID preamble interval.

The PON preamble generator 211 extracts the LLID from the frame generated from the MAC sublayer using the LLID_TXEN, and the MAC frame using the MAC_TXEN. By using the extracted frame, the PON preamble generator 211 generates an 8-byte PON preamble shown in FIG. 5. Then the CRC generator 212 generates a CRC for the PON preamble. The GMII transmission connector 213 adds the generated CRC to the PON preamble to form an 8-byte preamble, inserts the PON preamble before the MAC_TXEN as transport data, generates an enable signal for the whole frame, and forwards the generated enable signal to the PCS as a physical layer, which sends the enable signal to the destination ONU.

Upon receiving a frame from an ONU, the GMII reception connector 214 divides the input frame into a PON preamble and MAC data. The MAC data are stored in the shift register 215, and the PON preamble is checked at the CRC section 216 whether it has an error, as described above.

If the CRC section 216 cannot detect CRC errors, then the LLID filter 217 of the OLT extracts the LLID from the PON preamble and performs a lookup for the LLID register 218.

The LLID register 218 has as many 16-bit registers as there are ONUs connected to the network, and sets all the registers to "FFFF" in the power-ON state to receive an automatic discovery message from the MPCP sublayer. The LLID value allocated by the CPU is recorded in the LLID register 218 whenever the automatic discovery is performed. For 64 ONUs connected to one OLT, for example, the LLID register 218 must have 64 16-bit registers.

The LLID register 218 is readable and writable by the CPU (not shown), and the LLID values of the ONUs connected to the OLT are stored in the LLID register 218.

If the LLID extracted from the preamble of the received frame is not present in the lookup list of the LLID register 218, i.e., the extracted LLID is not identical to the LLID of the ONU connected to the network, then the LLID filter 217 discards the whole frame, increases the LLID error count value by "1" and causes the CPU (not shown) to check whether or not the LLID generated from the ONU has an error.

If the LLID extracted from the received preamble is present in the lookup list, then the LLID filter 217 forwards the corresponding LLID to the received frame generator 221 and generates a LLID_RXEN signal as an interval signal representing the frame interval of the LLID preamble.

The received frame generator 221 receives MAC frames and LLIDs to generate a combined frame of the format shown in FIG. 5, and forwards the combined frame with a MAC_RXEN signal representing the MAC frame interval to the upper layer, MAC sublayer.

Figure 6:
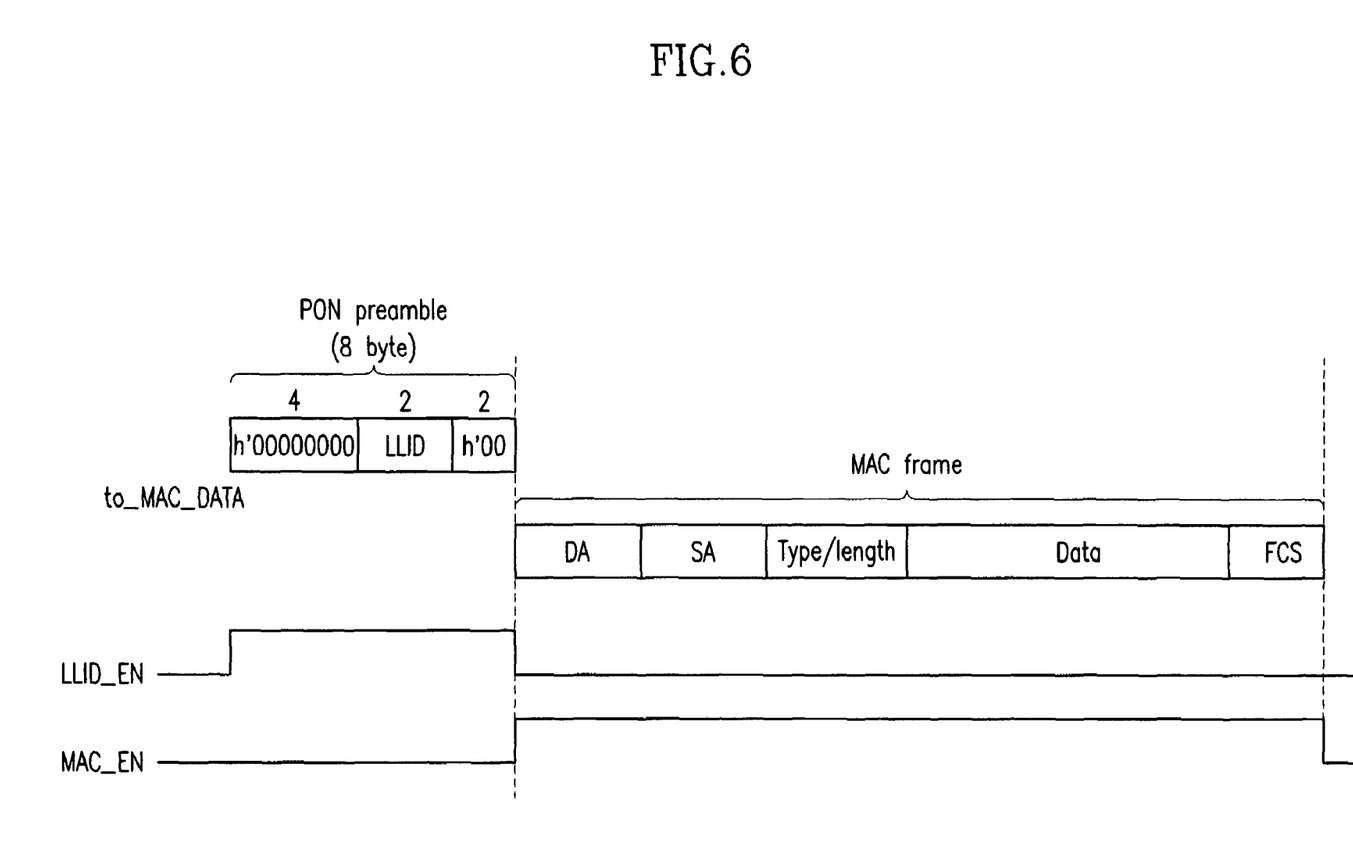
FIG. 6 is a frame format and timing diagram of a frame forwarded from the control node system shown in FIG. 5 to a MAC sublayer.

FIG. 6 is a frame format and timing diagram of a frame forwarded from the received frame generator 221 to the MAC sublayer, i.e., frame and timing diagram forwarding the LLID extracted from the RS sublayer to the upper layer.

The up-stream MAC sublayer needs two enable signals, i.e., a LLID_EN signal for identifying the LLID, and a MAC_EN signal for identifying the MAC frame. The LLID preamble is comprised of 8 bytes, out of which the upper 4 bytes and the lowermost 2 bytes represent a reserved word and are all set to zero. The extracted LLID is inserted at the fourth and fifth bytes. The LLID_EN signal is enabled during an 8-byte LLID preamble interval. The MAC_EN signal is enabled during the length of the frame except for the preamble.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, the embodiment of the present invention readily supports data communication between communication node systems while using the existing Ethernet protocol in the EPON.

What is claimed is:

1. A communication node system, which is for Ethernet-PON (Passive Optical Network), the communication node system comprising:
   an LLID register for storing an LLID (Logical Link Identification) being an allocated identifier;
   a preamble generator for generating a PON preamble using the LLID;
   a CRC (Cyclic Redundancy Check) generator for generating a CRC for the preamble;
   a transmission connector for combining transport data with the CRC-including preamble to generate a transport frame, and forwarding the transport frame to the network;
   a reception connector for receiving a frame from the network and dividing the received frame into a preamble and received data;
   a filter for extracting an LLID from the preamble, comparing the extracted LLID with the LLID stored in the register, and selectively filtering the extracted LLID; and
   a received frame generator for, based on the filtering result from the filter, discarding the received data, or combining the received data with the preamble to generate a received frame.

2. The communication node system as claimed in claim 1, further comprising:
   a CRC section for performing a CRC for the preamble divided from the received frame; and
   a status counter register for storing the CRC result of the CRC section.

3. The communication node system as claimed in claim 2, further comprising:
   a shift register for temporarily storing the received data during the CRC for the preamble.

4. The communication node system as claimed in claim 1, wherein the filter determines that the received frame is forwarded to itself, and performs a success operation on the received frame, when the extracted LLID is a broadcast LLID and is identical to the LLID stored in the LLID register.

5. The communication node system as claimed in claim 1, wherein the filter determines that the received frame is forwarded to itself, and performs a success operation on the received frame, when the extracted LLID is an anti-LLID and the predetermined Lower bits of the LLID stored in the LLID register are identical to the predetermined lower bits of the extracted LLID.

6. The communication node system as claimed in claim 5, wherein the filter discards the received frame when the extracted LLID is an anti-LLID and the predetermined lower bits of the LLID stored in the LLID register are not identical to the predetermined lower bits of the extracted LLID.

7. The communication node system as claimed in claim 1, wherein the preamble comprises a 2-byte SFD (Start Frame Delimiter), a 3-byte reserved word, a 2-byte LLID, and a 1-byte CRC.

8. The communication node system as claimed in claim 1, wherein the CRC generator generates a CRC for the preamble using a CRC-8.

9. A control node system, which is for data communication between a plurality of communication node systems in an Ethernet-PON (Passive Optical Network), the control node system comprising:
   an LLID (Logical Link Identification) register for storing LLIDs being identifiers allocated to the plural communication node systems connected to the network;
   a preamble generator for generating a PON preamble based on an LLID of a destination communication node system, when sending transport data supplied from an originating communication node system to the destination communication node system via the network;
   a CRC (Cyclic Redundancy Check) generator for generating a CRC for the preamble;
   a transmission connector for combining the transport data with the CRC-including preamble to generate a transport preamble, and forwarding the transport preamble to the network, thereby causing the network to forward the transport preamble to the destination communication node system;
   a reception connector for receiving a frame from the originating communication node system via the network, and dividing the received frame into a preamble and received data;
   a filter for extracting the LLID from the preamble, and comparing the extracted LLID with the LLID stored in the LLID register to determine whether or not the received frame is transferred from a controllable communication node system; and
   a received frame generator for combining the received data with the preamble to generate a received frame based on the filtering result of the filter.

10. The control node system as claimed in claim 9, wherein the filter discards the received frame when the lookup for the LLID register shows that the LLID extracted from the preamble of the received frame is not present in the LLID register.

11. The control node system as claimed in claim 10, wherein the received frame generator combines the received data with the preamble to generate a combined frame, generates an interval signal representing an interval of the received data, and forwards the generated interval signal together with the combined frame.

12. The control node system as claimed in claim 10, further comprising:
   a status counter register for storing the lookup result of the filter, the control node system increasing an error count value of the status counter register by "1" to determine whether or not the LLID of the received frame has an error, when the LLID extracted from the preamble of the received frame is not present in the LLID register.

13. The control node system as claimed in claim 9, wherein the LLID register comprises as many 16-bit registers as there are communication node systems connected to the network.

14. The control node system as claimed in claim 13, wherein the LLID register has a value of "FFFF" and stores an input LLID value with a message in a power-on state.

15. A communication system, which is for an Ethernet-PON (Passive Optical Network), the communication system comprising:
 at least one communication node system including a first LLID (Logical Link Identification) register for storing an LLID as an allocated identifier, a first preamble generator for generating a PON preamble using and including the LLID, a first CRC generator for generating a CRC for the preamble, and a first transmission connector for combining transport data with the CRC-including preamble to generate a transport frame and forwarding the transport frame to the network; and
 a control node system including a second LLID register for storing LLIDs as an identifier allocated to the at least one communication node system connected to the network, a first reception connector for receiving a frame from the at least one communication node system via the network and dividing the received frame into a preamble and received data, a first filter for extracting the LLID value from the preamble and comparing the extracted LLID value with the LLID stored in the first LLID register to determine whether or not the received frame is transferred from a controllable communication node system, a first received frame generator for combining the received data with the preamble to generate a received frame based on the filtering result of the first filter, a second preamble generator for receiving transport data to be transmitted to the at least one communication node system and generating a PON preamble based on a LLID of a destination communication node system of the transport data, a second CRC generator for generating a CRC for the preamble, and a second transmission connector for combining the transport data with the CRC-including preamble to generate a transport frame and forwarding the generated transport frame to the network, thereby causing the network to forward the transport frame to the destination communication node system.

16. The communication system as claimed in claim 15, wherein the communication node system further comprises:
 a second reception connector for receiving a frame from the network and dividing the received frame into a preamble and received data;
 a second filter for extracting an LLID value from the preamble and comparing the extracted LLID with the LLID stored in the first LLID register to selectively filter the extracted LLID; and
 a received frame generator for, based on the filtering result of the second filter, discarding the received data or combining the received data with the preamble to generate a received frame.

* * * * *